O. H. WATKINS.
WORM GEAR DRIVING MECHANISM.
APPLICATION FILED APR. 1, 1912.
1,060,802.
Patented May 6, 1913.
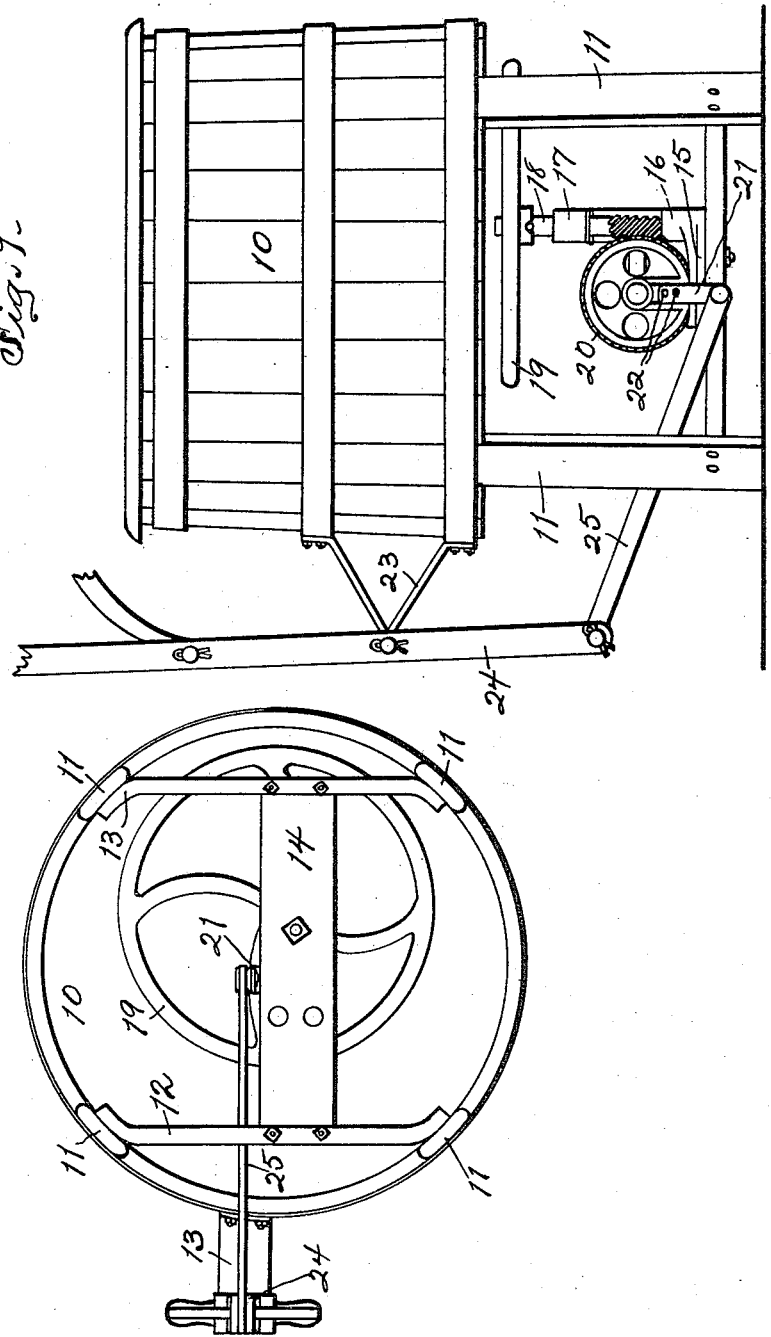
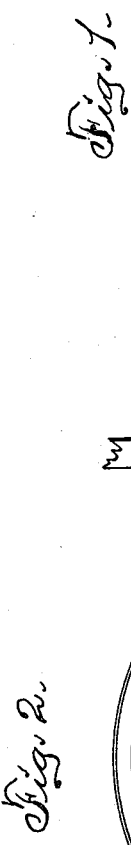
Attest:
F. D. Thompson
Earl M. Sinclair
Inventor:
Orla H. Watkins.
By ...... Atty

UNITED STATES PATENT OFFICE.

ORLA H. WATKINS, OF CLINTON, IOWA, ASSIGNOR TO HIMSELF, J. A. KELLY, AND W. J. KELLY, ALL OF CLINTON, IOWA.

WORM-GEAR DRIVING MECHANISM.

1,060,802.  Specification of Letters Patent.  Patented May 6, 1913.

Application filed April 1, 1912. Serial No. 687,896.

*To all whom it may concern:*

Be it known that I, ORLA H. WATKINS, citizen of the United States of America, and resident of Clinton, Clinton county, Iowa, have invented a new and useful Worm-Gear Driving Mechanism, of which the following is a specification.

The object of this invention is to provide improved means for transforming oscillatory motion into rotary motion.

A further object of this invention is to provide improved means for connecting a hand lever and balance wheel for mutual and retroactive operation.

A further object of this invention is to provide an improved construction for worm or spiral gearing.

My invention consists in the construction, arrangement and combination of elements hereinafter set forth, pointed out in my claims and illustrated by the accompanying drawing, in which—

Figure 1 is a side elevation illustrating my invention applied to a tub. Fig. 2 is a bottom plan of the same.

In the construction of the device as shown the numeral 10 designates a suitable support, in this instance the tub of a washing machine of common and well known form. The tub is carried by legs 11, in this instance four in number. Angle bars 12, 13 are arranged parallel with each other and connect opposite pairs of the legs 11. A plate 14 is bolted at its ends to and connects the angle bars 12, 13, and said plate is arranged below and spaced from the bottom of the tub. A bracket or stand 15 is mounted rigidly on and rises from the plate 14 and terminates beneath the bottom of the tub. The bracket or stand 15 is formed with alining bearings 16, 17, one above the other, and a worm (or spirally-toothed) shaft 18 is journaled in said bearings and projects above the upper bearing. The worm of the shaft is located between the bearings 16, 17. A balance wheel 19 is fixed to the upper end of the shaft 18 immediately beneath the bottom of the tub. A worm (or spiral) gear 20 is journaled on a horizontal axis in the bracket or stand 15 and meshes with the worm or spiral of the shaft 18. The gear 20 is formed with a seat or groove in one side and a crank arm 21 is laid therein and extends radially of and beyond the rim of the gear and is secured thereto adjustably by bolts 22. The crank arm 21 may be adjusted longitudinally to change its leverage on the gear. A bracket 23 is fixed to and extends outwardly from the tub and a hand lever 24, of any suitable construction, is fulcrumed between its ends on said bracket. A pitman 25 is pivoted at one end to the lower end of the lever 24 and is pivoted at the opposite end to the outer end of the crank arm 21. The hand lever 24 may be provided with any desired means of connection to washing devices on or in the tub, but my present invention does not have to do with such construction.

Any movement of oscillation of the hand lever 24 is communicated through the pitman 25 and crank arm 21 to the gear 20 and rotates said gear, and the movement of the gear is transmitted through the worm (or spiral) shaft 18 to rotate the balance wheel 19. The motion of the balance wheel reacts in inverse relation on the hand lever when manual force is relaxed from said lever.

I claim as my invention—

1. Driving mechanism comprising a vertical worm shaft, a balance wheel on said shaft, a worm gear arranged for rotation on a horizontal axis and meshing with the worm shaft, a crank arm arranged radially of the gear, a pitman pivoted at one end to said crank arm, and means for driving said pitman.

2. In a driving mechanism, a gear of spiral type, a crank arm on and adjustable radially of said gear, and a pitman pivoted to said crank arm and arranged to drive said gear.

Signed by me at Clinton, Iowa, this 29th day of November, 1911.

ORLA H. WATKINS.

Witnesses:
WM. J. BURKE,
H. A. KELLY.

Copies of this patent may be obtained for five cents each, by addressing the "Commissioner of Patents, Washington, D. C."